United States Patent
Becker et al.

(10) Patent No.: US 11,531,937 B2
(45) Date of Patent: Dec. 20, 2022

(54) SYSTEM AND METHOD FOR INSTRUCTING PERSONNEL ON WASHROOM MAINTENANCE REQUIREMENTS

(71) Applicant: Kimberly-Clark Worldwide, Inc., Neenah, WI (US)

(72) Inventors: Stephen Becker, Cumming, GA (US); Charlene B. Dunbar, Lilburn, GA (US); Jason Kirkland, Cumming, GA (US); Warren Moede, Atlanta, GA (US); Thomas H. Schulz, Roswell, GA (US); Chrissy M. Sheehan, Lafayette Hill, PA (US); Peter W. Shipp, Jr., Woodstock, GA (US); Paul F. Tramontina, Harleysville, PA (US); Matthew T Zielinski, Darien, CT (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 28 days.

(21) Appl. No.: 17/331,000

(22) Filed: May 26, 2021

(65) Prior Publication Data

US 2021/0279654 A1  Sep. 9, 2021

Related U.S. Application Data

(60) Continuation of application No. 16/900,180, filed on Jun. 12, 2020, now Pat. No. 11,030,553, which is a
(Continued)

(51) Int. Cl.
*G06Q 10/08* (2012.01)
*G06Q 10/06* (2012.01)
(Continued)

(52) U.S. Cl.
CPC ......... *G06Q 10/0631* (2013.01); *G06Q 10/06* (2013.01); *G06Q 10/087* (2013.01);
(Continued)

(58) Field of Classification Search
CPC .. G06Q 10/0631; G06Q 10/06; G06Q 10/087; G06Q 10/20; G07F 9/002;
(Continued)

(56) References Cited

U.S. PATENT DOCUMENTS 4,756,030 A  7/1988  Juliver
5,031,258 A  7/1991  Shaw
(Continued)

FOREIGN PATENT DOCUMENTS

KR  2020080004883  10/2008

OTHER PUBLICATIONS

PCT Search Report, dated Oct. 30, 2015.
Supplementary European Search Report, dated Sep. 28, 2018.

*Primary Examiner* — Benjamin R Shaw
(74) *Attorney, Agent, or Firm* — Dority & Manning, P.A.

(57) ABSTRACT

A system and associated method are provided for maintenance of a plurality of washroom facilities by maintenance personnel, wherein each of the washroom facilities has one or more consumable product dispensers that require periodic refill. For each of the washroom facilities, the product dispensers are configured with a sensor that detects a product level or amount condition of the product dispenser, the sensors in communication with a monitoring station assigned to the washroom facility. A set of instructions unique to each of the washroom facilities is generated based upon the detected product level or amount conditions of the dispensers in the respective washroom facility, the set of instructions including instructions as to the amount of product refill to be added to the dispensers. With an identification
(Continued)

(ID) system configured within each washroom facility, maintenance personnel that enter the washroom facility are identified and provided with the unique set of instructions in a message via a mobile smart device carried by the maintenance personnel or an audio or visual display device within the washroom facility.

14 Claims, 3 Drawing Sheets

Related U.S. Application Data continuation of application No. 16/551,082, filed on Aug. 26, 2019, now Pat. No. 10,719,790, which is a division of application No. 15/560,198, filed as application No. PCT/US2015/023312 on Mar. 30, 2015, now Pat. No. 10,395,192.

(51) Int. Cl.
*G06Q 10/00* (2012.01)
*G07F 9/02* (2006.01)
*G07F 13/02* (2006.01)
*G07F 17/18* (2006.01)
*G07F 9/00* (2006.01)
*H04W 4/80* (2018.01)

(52) U.S. Cl.
CPC ............ *G06Q 10/20* (2013.01); *G07F 9/002* (2020.05); *G07F 9/026* (2013.01); *G07F 13/025* (2013.01); *G07F 17/18* (2013.01); *H04W 4/80* (2018.02)

(58) Field of Classification Search
CPC ........ G07F 9/026; G07F 13/025; G07F 17/18; H04W 4/80
USPC ...................................................... 705/7.13
See application file for complete search history.

(56) References Cited

U.S. PATENT DOCUMENTS

| | | | |
|---|---|---|---|
| 5,202,666 A | 4/1993 | Knippscheer |
| 5,610,589 A | 3/1997 | Evans et al. |
| 5,771,925 A | 6/1998 | Lewandowski |
| 5,793,653 A | 8/1998 | Segal |
| 5,808,553 A | 9/1998 | Cunningham |
| 5,812,059 A | 9/1998 | Shaw et al. |
| 5,900,801 A | 5/1999 | Heagle et al. |
| 5,939,974 A | 8/1999 | Heagle et al. |
| 5,945,910 A | 8/1999 | Gorra |
| 5,952,924 A | 9/1999 | Evans et al. |
| 5,966,753 A | 10/1999 | Gauthier et al. |
| 6,131,587 A | 10/2000 | Chardack et al. |
| 6,147,607 A | 11/2000 | Lynn |
| 6,236,317 B1 | 5/2001 | Cohen et al. |
| 6,236,953 B1 | 5/2001 | Segal |
| 6,278,372 B1 | 8/2001 | Velasco, Jr. et al. |
| 6,360,181 B1 | 3/2002 | Gemmell et al. |
| 6,392,546 B1 | 5/2002 | Smith |
| 6,411,920 B1 | 6/2002 | McConnell et al. |
| 6,426,701 B1 | 7/2002 | Levy et al. |
| 6,542,568 B1 | 4/2003 | Howes, Jr. et al. |
| 6,577,240 B2 | 6/2003 | Armstrong |
| 6,707,873 B2 | 3/2004 | Thompson et al. |
| 6,882,278 B2 | 4/2005 | Winings et al. |
| 6,883,563 B2 | 4/2005 | Smith |
| 6,975,231 B2 | 12/2005 | Lane et al. |
| 7,015,816 B2 | 3/2006 | Wildman et al. |
| 7,236,097 B1 | 6/2007 | Cunningham |
| 7,242,307 B1 | 7/2007 | LeBlond et al. |
| 7,372,367 B2 | 5/2008 | Lane et al. |
| 7,597,122 B1 | 10/2009 | Smith |
| 7,605,704 B2 | 10/2009 | Munro et al. |
| 7,616,122 B2 | 11/2009 | Bolling |
| 7,659,824 B2 | 2/2010 | Prodanovich et al. |
| 7,682,464 B2 | 3/2010 | Glenn et al. |
| 7,698,770 B2 | 4/2010 | Barnhill et al. |
| 7,734,476 B2 | 6/2010 | Wildman et al. |
| 7,783,380 B2 | 8/2010 | York et al. |
| 7,804,409 B2 | 9/2010 | Munro et al. |
| 7,818,083 B2 | 10/2010 | Glenn et al. |
| 7,855,651 B2 | 12/2010 | LeBlond et al. |
| 7,898,407 B2 | 3/2011 | Hufton et al. |
| 8,085,155 B2 | 12/2011 | Prodanovich et al. |
| 8,094,029 B2 | 1/2012 | Ortiz et al. |
| 8,110,047 B2 | 2/2012 | Glenn et al. |
| 8,160,742 B2 * | 4/2012 | Goerg ................ A47K 10/3845 700/243 |
| 8,237,558 B2 | 8/2012 | Seyed Momen et al. |
| 8,350,706 B2 | 1/2013 | Wegelin et al. |
| 8,377,229 B2 | 2/2013 | Barnhill et al. |
| 8,395,515 B2 | 3/2013 | Tokhtuev et al. |
| 8,400,309 B2 | 3/2013 | Glenn et al. |
| 9,613,518 B2 | 4/2017 | Dunn et al. |
| 9,641,994 B2 | 5/2017 | Balsan et al. |
| 9,659,481 B2 | 5/2017 | Himmelmann et al. |
| 9,721,452 B2 | 8/2017 | Felch et al. |
| 9,972,193 B2 | 5/2018 | Laufer et al. |
| 10,008,098 B2 | 6/2018 | Ophardt |
| 10,037,678 B2 | 7/2018 | Becker et al. |
| 2002/0135486 A1 | 9/2002 | Brohagen et al. |
| 2002/0175182 A1 * | 11/2002 | Matthews ............. A47K 5/1217 222/52 |
| 2003/0011646 A1 | 1/2003 | Levine et al. |
| 2003/0030562 A1 | 2/2003 | Lane et al. |
| 2003/0191692 A1 | 10/2003 | Vogel |
| 2004/0001009 A1 | 1/2004 | Winings et al. |
| 2004/0034289 A1 | 2/2004 | Teller et al. |
| 2004/0090333 A1 | 5/2004 | Wildman et al. |
| 2004/0150527 A1 | 8/2004 | Harper et al. |
| 2004/0193449 A1 | 9/2004 | Wildman et al. |
| 2004/0220822 A1 * | 11/2004 | Talarico ........... G06Q 10/06398 705/7.42 |
| 2005/0114154 A1 | 5/2005 | Wolkowicz et al. |
| 2005/0171634 A1 | 8/2005 | York et al. |
| 2005/0248461 A1 | 11/2005 | Lane et al. |
| 2006/0132316 A1 | 6/2006 | Wildman et al. |
| 2006/0160059 A1 | 7/2006 | Dompier et al. |
| 2006/0208887 A1 | 9/2006 | Fields et al. |
| 2007/0247316 A1 | 10/2007 | Wildman et al. |
| 2008/0001763 A1 | 1/2008 | Raja et al. |
| 2008/0033751 A1 | 2/2008 | Greene |
| 2008/0103636 A1 | 5/2008 | Glenn et al. |
| 2009/0091458 A1 | 4/2009 | Deutsch |
| 2009/0101751 A1 * | 4/2009 | Cittadino ........... A47K 10/3612 242/563 |
| 2009/0119142 A1 * | 5/2009 | Yenni ...................... H04L 67/12 705/7.15 |
| 2009/0276239 A1 | 11/2009 | Swart et al. |
| 2010/0153374 A1 | 6/2010 | LeBlond et al. |
| 2011/0316695 A1 * | 12/2011 | Li ..................... G06Q 10/06315 340/539.13 |
| 2011/0316701 A1 | 12/2011 | Alper et al. |
| 2012/0062382 A1 * | 3/2012 | Taneff .................. G08B 21/245 340/573.1 |
| 2012/0112906 A1 | 5/2012 | Borke et al. |
| 2013/0240554 A1 * | 9/2013 | Strahlin ................ A47K 10/32 221/6 |
| 2013/0332184 A1 | 12/2013 | Burnham et al. |
| 2014/0364148 A1 | 12/2014 | Block et al. |
| 2015/0206077 A1 * | 7/2015 | Himmelmann ............................. G06Q 10/063118 340/870.07 |
| 2015/0228181 A1 | 8/2015 | Himmelmann et al. |
| 2016/0048827 A1 | 2/2016 | Corbalis et al. |
| 2016/0088443 A1 | 3/2016 | Kostka et al. |
| 2016/0270029 A1 | 9/2016 | Herring et al. |
| 2016/0364685 A1 * | 12/2016 | Wass .................. G06Q 10/0631 |
| 2017/0134887 A1 * | 5/2017 | Wegelin ................ H04W 64/00 |

(56) References Cited

U.S. PATENT DOCUMENTS

2018/0293874 A1    10/2018  Ophardt et al.
2018/0368627 A1*   12/2018  Ghazi ................... G06Q 10/08
2019/0147375 A1*    5/2019  Ghazi ................... G06Q 10/20
                                                            700/236

* cited by examiner

SYSTEM AND METHOD FOR INSTRUCTING PERSONNEL ON WASHROOM MAINTENANCE REQUIREMENTS

RELATED APPLICATIONS

The present application is a Continuation of U.S. application Ser. No. 16/900,180, filed Jun. 12, 2020, which is a Continuation Application of U.S. application Ser. No. 16/551,082, filed Aug. 26, 2019, which is a Divisional Application of U.S. application Ser. No. 15/560,198, filed Sep. 21, 2017, which claims priority to PCT/US2015/023312, filed Mar. 30, 2015.

FIELD OF THE INVENTION

The present invention relates generally to public or semi-private washrooms, such as public restrooms, wherein maintenance personnel are provided instructions generated as a function of actual requirements or conditions specific to individual washrooms.

BACKGROUND

With respect to typical workplace washroom facilities, such as those facilities in a manufacturing plant, health care facility, office building, and the like, maintenance of the facilities is generally assigned to a maintenance team member that visits the facility on a scheduled or periodic basis to refill dispensers and ensure the cleanliness of the facility. The same person or persons may be assigned responsibility for a multitude of washroom facilities within building or business site.

In general, the maintenance person has little to no knowledge of the condition of the facility, especially the fullness state of the dispensers, until actually entering the facility. In this regard, the maintenance person must be prepared for completely empty states of the dispensers in the various facilities they are responsible for. The refill supplies are generally not stocked in the washroom facilities, and the maintenance person must carry sufficient refill supplies for a "worst case scenario", which can be an overly burdensome task depending on the number of facilities and types of dispensers.

It has also been found that significant product wastage can be attributed to certain maintenance practices. For example, a towel dispenser may be one-third full when checked by a maintenance person. It is a common practice, however, to attempt to overstuff the dispenser with a full refill during a scheduled maintenance visit. This overstuffed condition often results in jamming of the dispenser or overuse of towels by the washroom patrons, for example when multiple towels are dispensed as a result of the overstuffed condition. If the dispenser has an overstuff-prevention device, it is also a practice to discard the remaining towels in the dispenser to that a new, full, refill can be loaded into the dispenser. Over time, such wastage can be quite expensive for the building proprietor.

The industry would benefit from a system and method wherein maintenance personnel are provided with specific instructions regarding the conditions and requirements of a particular washroom facility upon entering the respective facility that reduce the amount of wastage generated with conventional practices.

SUMMARY OF THE INVENTION

Objects and advantages of the invention will be set forth in part in the following description, or may be obvious from the description, or may be learned through practice of the invention.

A method and associated washroom system are presented incorporating aspects of the invention. The term "washroom" is used generically herein to encompass any manner of public, semi-public, or private facility visited by patrons to use sink or toilet facilities, bathing facilities, changing facilities, and so forth. Such facilities are also known as restrooms, toilet closets, public bathrooms, men's room, ladies' room, and the like. A typical public or semi-private washroom has a number of toilet facilities or urinals and sinks.

Although the present method and washroom system are particularly useful in an "away-from-home" public or semi-private environment, the system is not limited by scope of use. As used herein, the term "away-from-home" means a place or location where people congregate for various reasons or purposes that are outside the typical home. Examples of away-from-home locations include places of business, such as office buildings, office suites, retail stores, and warehouses, manufacturing facilities; schools; hospitals and other types of medical facilities; places of worship; hotels and motels; conference centers; and the like. The method and system are particularly well-suited for structures wherein multiple washroom facilities are provided for use of the building tenants or an industrial or manufacturing site wherein multiple site facilities are provided for a controlled populace. It should be appreciated though that the present washroom system and method may prove useful in a residential or private environment, and such uses are within the scope and spirit of the invention.

In accordance with aspects of the invention, a system and related method are provided for maintenance of a plurality of washroom facilities by maintenance personnel. Such maintenance personnel may be members of a janitorial service that has responsibility for upkeep, restocking, and cleanliness of the washroom facilities on a daily basis, or members of a building support staff, and so forth. Each of the washroom facilities has one or more consumable product dispensers that require periodic refill, such as paper product dispensers, soap dispensers, toilet tissue dispensers, and so forth. Within each washroom facility, the product dispensers are configured with a sensor that detects a level or amount condition of the product in the dispenser. The sensors are in communication with a monitoring station assigned to the washroom facility, wherein the monitoring station collects usage data related to the various dispensers. The monitoring station may include any manner of computer systems for this purpose and may be in communication with the sensors via a wired or wireless communication network. A set of instructions are generated that are unique to each of the washroom facilities based upon the detected product level or amount conditions of the dispensers in the respective washroom facility. The set of instructions includes instructions to maintenance personnel as to the amount of product refill to be added to the dispensers. An identification (ID) system is configured within each washroom facility for identifying a maintenance personnel that enters the washroom facility, wherein the maintenance personnel is then provided with the unique set of instructions in a message. In a particular embodiment, this message is delivered via a mobile smart device (e.g., a "smart phone") carried by the maintenance personnel.

In an alternative embodiment, the message is delivered via an audio or visual broadcast device within the washroom facility. The broadcast device may be any one or combination of an audio device, video device, or audio-video device. For example, the broadcast device may be an audio-video screen that displays the unique instructions and message in audio and visual format. In one embodiment, multiple such devices are located throughout the washroom facility and are operatively linked to a common receiver such that the multiple devices display generally the same instructions or message.

In one embodiment, the washroom facility comprises a plurality of individual functional locations, such as a plurality of toilet stalls or multiple sinks, with each of the functional locations having a respective receiver and associated broadcast device.

In a particular embodiment, the maintenance personnel is identified by name in the message provided with the set of instructions. This personalization aspect may facilitate an enhanced sense of pride on the part of the maintenance personnel, as well as provide an accountability component to the system and method.

A plurality of the washroom facilities may be assigned to a common monitoring station. For example, all of the washroom facilities within a building or site location may communicate with the same monitoring station via a suitable wired or wireless communication network. The monitoring station may be interfaced with a server system for carrying out the functions described herein. The server system may be a remote system that functions with a plurality of the monitoring stations or may be a dedicated system for each washroom facility. With this embodiment, the ID system may include an ID signal transmitter carried by each of the maintenance personnel that generates an ID signal that is unique to the maintenance personnel. The washroom facilities are each configured with a receiver that receives the ID signals from the ID signal transmitters and transmits the ID signals to a controller that is in communication with the server system. The transmissions to the server system also identify the particular washroom facility.

The server system maintains a file on each of the washroom facilities, wherein conditions or requirements specific to the washroom facilities are determined by input from the monitoring station associated with the washroom facility and entered into the files on a periodic basis. The server system accesses the files and uses the information specific to each washroom facility to generate the unique set of instructions for each facility.

The set of instructions may vary widely within their scope of content. In one embodiment, the instructions may relate to the fill status of the various dispensers in the washroom facility and may instruct the maintenance personnel as to how much product to refill in a particular dispenser, or not to refill a particular dispenser, and so forth. In other embodiments, the instructions may include reference to complaints or other conditions that were logged or otherwise entered into the server system. For example, events or activities in the building that may affect future washroom usage may be automatically or manually entered into the server system from any source, such as from an electronic schedule or calendar maintained by the building supervisor. The unique set of instructions may inform the maintenance personnel of such upcoming events that may increase usage of the washroom facility. For example, the instructions may include dispenser refill instructions based on an anticipated usage of the washroom before a next scheduled visit by the maintenance personnel.

In another embodiment, the method and system may include providing to the maintenance personnel a message at a beginning of their work shift regarding expected product refill requirements of the washroom facilities assigned to the maintenance personnel based on current conditions or requirements contained in the washroom facility files, including historical product usage data. In this manner, the maintenance personnel can accurately load their cart with the required refill products and need not carry excess product.

In particular embodiments of the system, the ID signal transmitters carried by the maintenance personnel are Bluetooth Low Energy (BTLE) beacons that emit a unique BTLE ID signal, and the server system maintains a library of the unique BTLE signal assigned to each maintenance personnel. The receivers within the washroom facilities are BTLE-enabled receivers that receive and transmit all or a portion of the unique BTLE ID signals to the controller to enable retrieval of the file related to the unique BTLE ID signal by the server system. The BTLE beacon may be incorporated with a device provided to the maintenance personnel, such as a component of an employee identification device, an electronic dongle, and so forth. In a particular embodiment, the BTLE beacon is incorporated with a mobile smart device carried by the maintenance personnel, the mobile smart device having an application that causes the mobile smart device to transmit the unique BTLE ID signal and receive personalized messages and instructions from the server system, such as the pre-shift instructions discussed above.

DETAILED DESCRIPTION OF THE INVENTION

Reference will now be made in detail to one or more embodiments of the invention, examples of the invention, examples of which are illustrated in the drawings. Each example and embodiment are provided by way of explanation of the invention and is not meant as a limitation of the invention. For example, features illustrated or described as part of one embodiment may be used with another embodiment to yield still a further embodiment. It is intended that the invention include these and other modifications and variations as coming within the scope and spirit of the invention.

As mentioned, in one aspect, the present invention relates to a method and system for maintenance of washroom facilities, particularly where maintenance personnel are required to periodically refill consumable product dispensers within the facilities, such as paper towel dispensers, soap dispensers, toilet tissue dispensers, and so forth. The maintenance personnel may be members of a janitorial service that has responsibility for upkeep, restocking, and cleanliness of the washroom facilities on a daily basis, or members of a building support staff, and so forth.

Figure 1:
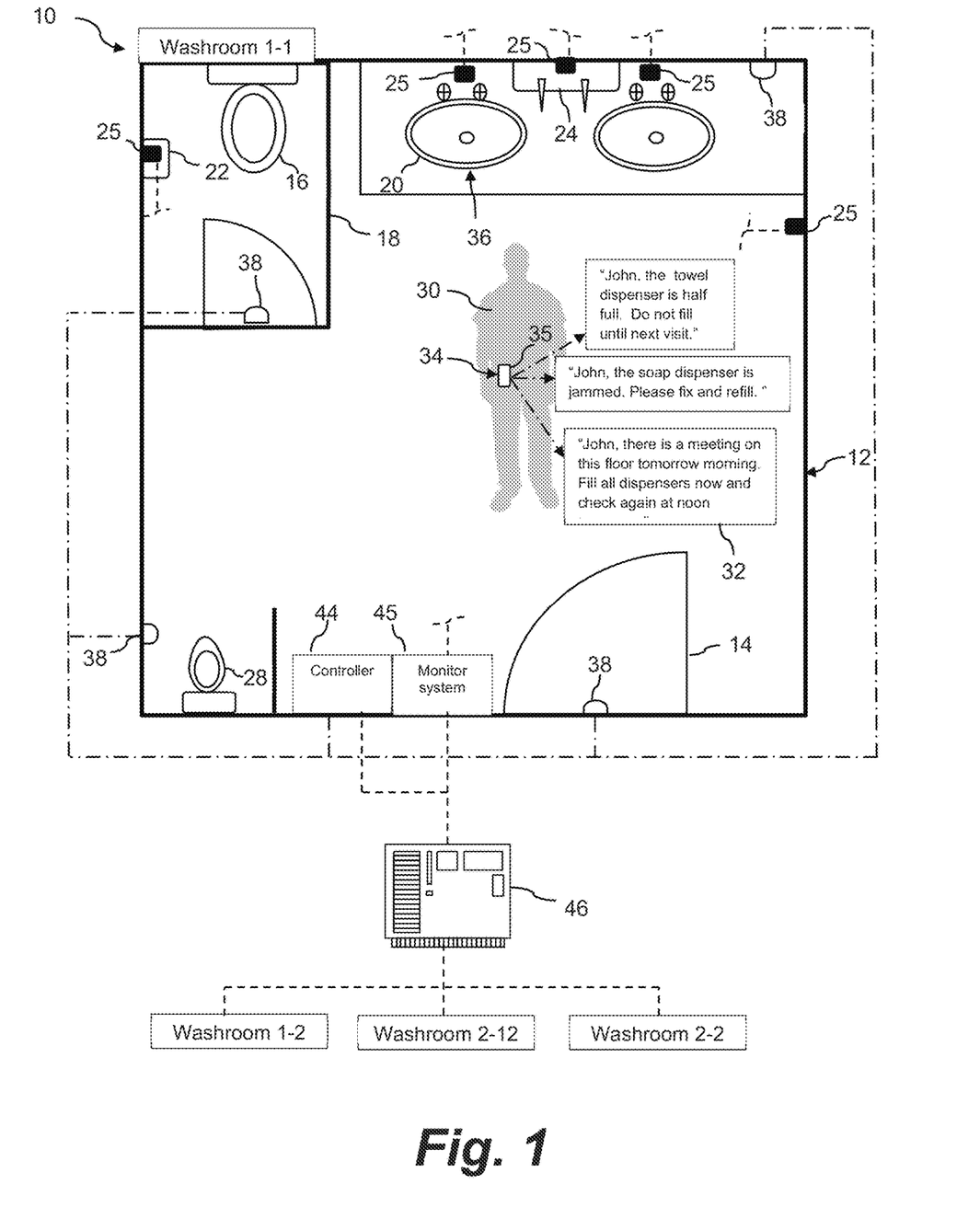
FIG. 1 is a diagram view of a washroom facility incorporating a system and method in accordance with aspects of the present invention.

Referring to FIG. 1, an embodiment of a system and related method 10 are illustrated with respect to a public or semi-private washroom facility 12 within a building or business site location. The building may have a plurality of similarly configured facilities 12 on one or multiple floors.

The design and features of the washroom facility 12 depicted in FIG. 1 are for illustrative purposes only. The washroom facility 12 is depicted as a men's restroom facility having one or more individual stalls 18 (with individual toilets 16) and one or more urinals 28. A number of sinks 20 are also provided. Any combination of other conventional washroom components may also be provided in the washroom facility 14, such as toilet tissue dispensers 22, soap dispenser 24, towel dispenser 26, and so forth. The individual stalls 18, urinals 28, and sinks 20, may be considered as "functional locations" 36 wherein patrons may perform a desired washroom function within the facility 12. It should be appreciated that any manner of additional functional locations 36 may also be included in the washroom facility 12, such as shower stalls, dressing rooms, infant changing stations, and so forth.

FIG. 1 depicts a maintenance personnel 30 in the washroom facility 12. This person has responsibility for ensuring that the various product dispensers 22, 24, 26 are operable and filled, and for the overall cleanliness of the facility 12.

Within each washroom facility 12, the product dispensers 22, 24, 26 are configured with a sensor 25 that detects a level or amount condition of the product in the dispenser based on any number of operational principles, such as run time of the dispenser or direct measurement of the amount of product dispensed. Numerous types of these product dispensers are well known in the industry and a detailed explanation thereof is not necessary for purposes of the present disclosure. The product dispensers 22, 24, 26 are in communication with a monitoring system 45 via any manner of suitable wireless communication system (as indicated by the dashed lines in FIG. 1). The monitoring system 45 is a computer-implemented system that may be remotely located from the washroom facility 12 or configured within the facility 12. The monitoring system 45 may monitor a number of similarly-configured washroom facilities 12 within a building or business site location. With this particular system 10, a controller 44 (described in greater detail below) is also in communication with the monitoring system 45 and, thus, can receive information regarding product usage/amount for any one of the dispensers 22, 24, 26 located in the washroom facility 12. The monitoring system 45 may also be in direct communication with a system server 46 (also described in greater detail below). Information from the monitor system 45 may be used by the server system to generate the set of instructions and messages delivered to the maintenance personnel 30 that are unique to each of the washroom facilities 12 based upon the detected product level or amount conditions of the dispensers 22, 24, 26 in the respective washroom facility 12.

Still referring to FIG. 1, the instructions may be delivered to the maintenance personnel 30 via messages 32 that are automatically displayed or played when the maintenance personnel 30 enters the washroom facility 12 and is identified. The set of instructions 32 may vary widely within their scope of content. As mentioned, the set of instructions 32 may include instructions as to the amount of product refill to be added to a particular dispenser. For example, one of the instructions 32 in FIG. 1 informs the maintenance personnel 30 by name ("John") that the paper towel dispenser is half full and should not be refilled until his next scheduled visit to the facility 12. Another instruction 32 informs "John" that the soap dispenser is jammed and needs repair, as well as refilling. The instructions 32 may include reference to complaints or other conditions that were logged or otherwise entered into the server system 46. For example, events or activities in the building that may affect future washroom usage may be automatically or manually entered into the server system 46 from any source, such as from an electronic schedule or calendar maintained by the building supervisor. An instruction 32 may inform the maintenance personnel 30 of such upcoming events that may increase usage of the washroom facility, as indicated in FIG. 1. The instructions may include dispenser refill instructions based on an anticipated usage of the washroom before a next scheduled visit by the maintenance personnel 30.

In the embodiment of FIG. 1, the instructions 32 are delivered to the maintenance personnel 30 via a mobile smart device 35 carried by the person 30, such as a smart phone, tablet, PDA, or other network-enabled device (all referred to herein generically as a "mobile smart device"). The instructions 32 may be delivered in the form of text messages, emails, voice messages, or any other format supported by the mobile smart device 35.

Referring to FIG. 1, to carry out the steps discussed above, the washroom facility 12 is configured with one or more receivers 38 strategically located throughout the facility. Each maintenance personnel 30 is provided with an ID signal transmitter 34 that transmits an ID signal that is unique to the particular person 30 and is received by one or more of the receivers 38 depending on the person's location within the facility 12. In this manner, as explained in greater detail below, the system 10 (in particular, the server system 46) is able to differentiate between personnel 30 that enter the facility 12.

The ID signal transmitters 34 carried by the maintenance personnel 30 may be small, portable devices that are provided by the janitorial service, building supervisor, or the like, for example in the form of an attachment to a work badge, bracelet, token, dongle, and so forth. In certain embodiments, as indicated in FIG. 1, the transmitter 34 may be incorporated with a person's mobile smart device 35, which can run a low-power background application previously downloaded by the personnel 30 from a source (e.g. a website) that allows the mobile smart device to function as a transmitter at times programmed by the user, for example during normal working hours.

In the embodiment illustrated in FIG. 1, the washroom facility 14 includes a receiver 38 positioned above or near the entrance or door 14 to the facility 12. At this location, the receiver 38 is used to detect the maintenance personnel 30 as they enter the facility 12. Respective receivers 38 may also located at the various functional locations 36 within the washroom facility 12 to initiate messages 12 targeted to locations or dispensers within the facility 12. For example, if the receiver 38 located near the sinks 20 detects a maintenance personnel for a defined period of time, a message 32 may be delivered that relates specifically to the status of the soap dispensers 24 or paper towel dispenser 26.

Still referring to FIG. 1, the system 10 includes a controller 44 that is in wired or wireless communication with the receivers 38 located within the washroom facility 12. The controller 44 may be located within the facility 12, for example within a cabinet or other location, or remote from the facility 12. The controller 44 is in communication with the central server system 46 via any suitable communications network and includes any manner of hardware and software configuration to carry out the functions described herein, such as setting/controlling the various functions of the receivers 38, as well as well as various broadcast devices 42, 43, as described in greater detail below.

As mentioned, the maintenance personnel's transmitter 34 (which may be a mobile smart device 35) will generate and transmit a unique signal received by one of the receivers 38 that will identify the particular person 30 to the server system 46. The receiver 38 transmits all or a portion of the received ID signal to the controller 44, which may tag the signal with the identity and location of the particular washroom facility 12 and receiver 38 before transmitting the signal (which includes a signal generated from the ID signal) to the central server system 46.

The central server system 46 is in communication with the all of the various controllers 44 and includes a memory with a respective file associated with each of the unique ID signals, wherein the system 46 retrieves or opens the stored file associated with the unique ID signal to generate the appropriate instruction messages 32 as a function of the updated status of the various dispensers 22, 24, 26 in the identified washroom facility 12 relayed by the monitor system 45. The respective washroom facility file may include any type of relevant information, such as complaints, comments, or other conditions that were logged or otherwise entered into the server system 46 from any source. The files may contain information on events or activities in the building that may affect future washroom usage, wherein such information may be automatically or manually entered into the server system 46 from any source, such as from an electronic schedule or calendar maintained by the building supervisor that is automatically imported into the server system 46 on a regular basis.

In an embodiment not depicted in the figures, the method and system may include providing to the maintenance personnel 30 a message at a beginning of their work shift regarding expected product refill requirements of the washroom facilities 12 assigned to the maintenance personnel based on current conditions or requirements contained in the washroom facility files, including historical product usage data. In this manner, the maintenance personnel can accurately load their cart with the required refill products and need not carry excess product. This type of message can be generated by the server system 46 based on the information content of the respective washroom files and delivered to the personnel 30 via any convenient means, such as an email, text message, paper notice, and so forth.

Figure 2:
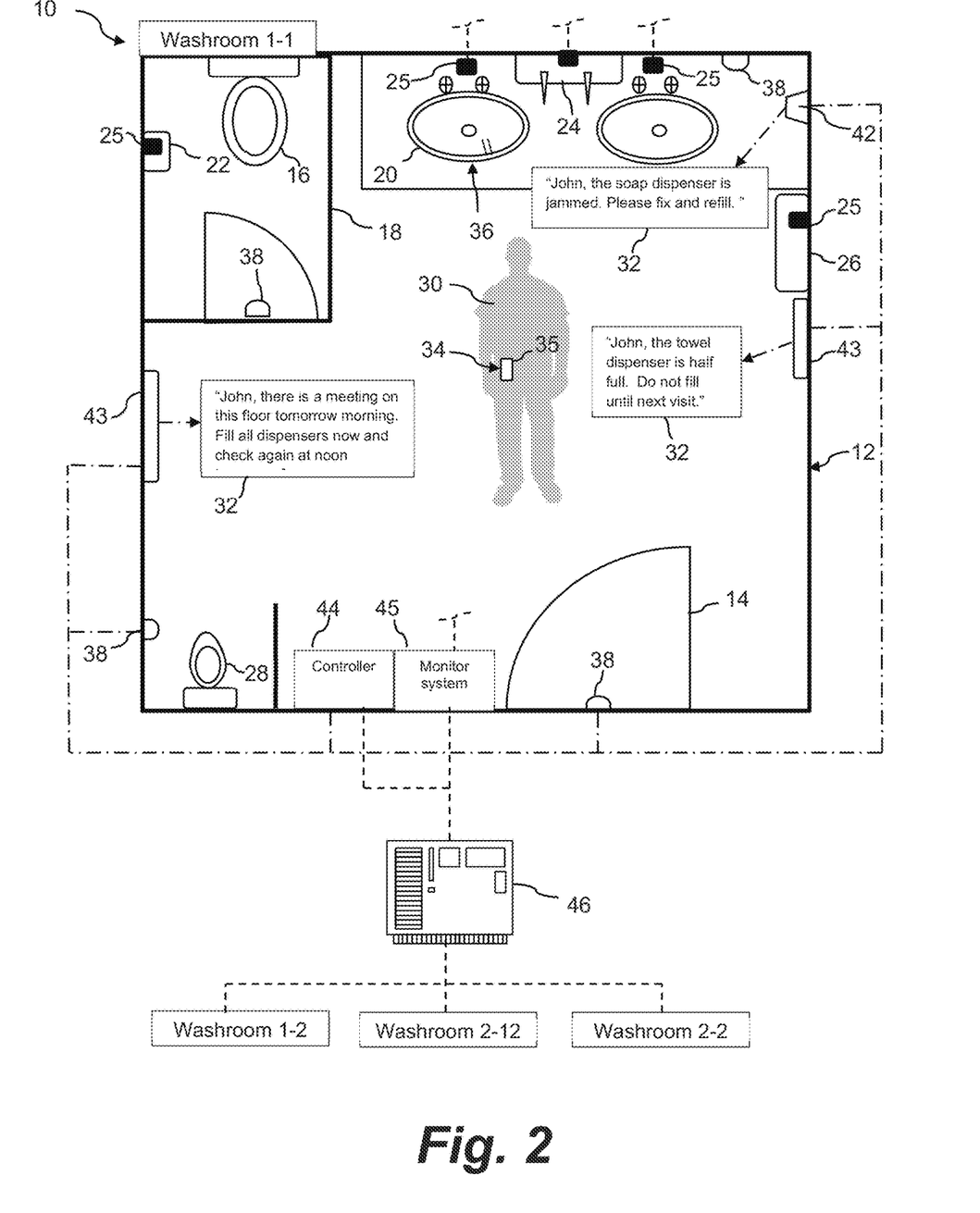
FIG. 2 is a diagram view of a washroom facility incorporating an alternate system and method in accordance with aspects of the present invention.

The embodiment illustrated in FIG. 2 is substantially the same as the embodiment of FIG. 1 with the exception that the instruction messages 32 are transmitted to the maintenance personnel via the controller 44 and a broadcast device 42, 43 within the washroom facility 12. For example, a broadcast device 42 in the form of a speaker is provided near the sinks 20 and transmits the instruction message 32 relating to the status of the soap dispensers 24. Another broadcast device 43 is provided on a wall of the facility 12 and is an audio/video (A/N) device that informs the personnel 30 of upcoming events that may affect washroom usage, as well as instructions for refilling the dispensers in view of an upcoming event. This A/N 43 device may be used to display any other type of information to the employee desired by the building administrator. All of these devices 42, 43 are in communication with the controller 44 via a wireless communications network, as depicted by dashed lines in FIG. 1.

The transmitter devices 34 carried by the maintenance personnel 30 may be low-power devices having a defined limited transmit range such that the personnel 30 must be relatively close to a receiver 38 to be detected. For example, as the person 30 enters the facility 12, the receiver 38 above the door 14 will detect the person's transmitter device 34, and the person is automatically identified by the server system 46 upon entering the facility 12. At this point in time, all instructional messages 32 may be delivered to the maintenance personnel 30 via any combination of the broadcast devices 42, 43.

In an alternate embodiment, however, it may be desired to provide focused instructional messages 32 when the personnel 30 is near a particular dispenser 22, 24, 26 or functional location 36. For this, other receivers 38 may be strategically located relative to the other functional locations 36 so as only to detect the person 30 at a distance/location that reasonably assures that the person is at the particular location 36. In addition, with this configuration, a number of different maintenance personnel 30 may be within the same washroom facility 12 servicing different ones of the functional locations 36 and individually detected by system. The focused messages may be delivered via the person's mobile smart device 35 (FIG. 1) or, as in the embodiment of FIG. 2, each of the functional locations 36 may be configured with a respective broadcast device 42, 43 so that the respective personnel 30 servicing the individual functional location 36 can receive a unique instructional message 32 via the broadcast device associated with their functional location. For example, a maintenance personnel 30 at one of the sink locations 20 may be detected, while a different employee in the stall 18 will be separately detected. The server system 46 may generate and transmit a separate instructional message 32 to each of these personnel that are broadcast over different devices 42, 43.

As discussed with respect to FIGS. 1 and 2, each of the washroom facilities 12 is equipped with wireless communication capability between the receivers 38 and the transmitters 34 carried by the respective employees 30, wherein an intermittently transmitted data packet (i.e., unique ID signal) is transmitted and received within a limited range. In this regard, the washroom facilities 12 are considered to be "communication-enabled" facilities. It has been found that Bluetooth Low Energy (BTLE) technology is particularly well-suited for purposes of systems 10 in accordance with the present subject matter. For example, the transmitter devices 34 carried by the employees 30 may be BTLE beacons that transmit the unique ID signal as a BTLE formatted signal, and the receivers 38 are BTLE scanners configured to receive and recognize the BTLE formatted signal 40.

BTLE beacons are commercially available and are relatively small devices that can be disguised as a "trinket" that is worn or carried by the personnel 30. For example, the BTLE beacon may be a bracelet (e.g., similar to a medical alert bracelet), a component of an identification badge worn by company employees, a decorative or functional item attached to a person's belt or clothes, and so forth.

BTLE devices are well-known to those skilled in the art, and a detailed explanation of their function and operation is not necessary for an understanding and appreciation of the present invention. Briefly, BTLE beacons are a class of low-energy, low-cost radio transmitters that can a receiver running BTLE applications of their presence, which in turn enables the receiver to perform certain actions when in close proximity to the beacon. These devices are often referred to as "iBeacons", which is the name Apple chose for its implementation of the BTLE technology. Each BTLE beacon broadcasts a unique identification signal using the BTLE standard format. These unique signals are also known as iBeacon "advertisements." The BTLE receiver runs an application that enables the device to scan for and receive the signals within transmitting range of the BTLE beacons. The receiver will automatically "react" to the received signal and may start other BTLE-enabled applications for various purposes, including communication with a central server, which in this case is the central server system 46.

A typical use of BTLE technology is relatively precise indoor geo-location ("micro-location"). A BTLE-enabled application on the receiver is notified when the BTLE beacon (transmitter 34) moves out of range of the receiver, and thus is able to determine distance of the transmitter 34 (and thus the personnel 30) from the receiver 38. The exact geo-location of the receiver 38 is known, and thus the exact location of the transmitter 34 is calculated based on relative distance from the receiver 38 as a function of signal strength. With this location information, the server system 46 in communication with the receivers 38 via the controller 44 can generate a unique instructional messages 32 based on location of the personnel 30 within a washroom facility 12.

In certain embodiments, the BTLE beacon function may be incorporated with the personnel's mobile smart device 35, which runs a low-power background application previously downloaded by the employee 30 from a source (e.g. a website) that allows the mobile smart device 35 to function as a BTLE beacon that intermittently transmits the unique BTLE signal during certain times of the day, for example during normal working hours, or other times programmed by the personnel 30.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

As mentioned, certain embodiments will have multiple washroom facilities 12 within a single building or multiple buildings linked to one or more central server system 46 and one or more monitoring systems 45, with each product dispenser and receiver 38 within the multiple of washroom facilities 12 in communication with the systems 45, 46. In this regard, a communications network is configured for these functions, wherein the individual dispensers are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected and/or multiplexed to the network via the direct network links. Further, the direct network links may represent secure communications channels physically hardened against tampering and/or the communications may be encrypted to prevent unauthorized access to information transmitted thereon.

The central server system 46 (which may be integrated with a monitoring system 45) may include a host computer, which may be an integrated server, or include any manner of periphery server or other hardware structure. The central processor system 46 may be a single networked computer, or a series of interconnected computers having access to the network via a gateway or other known networking system. Generally, the central server system 46 may include a central controller configured to manage, execute and control the individual terminal dispenser units, and to interface with the network enabled broadcast devices for retrieval/generation and play of the personalized messages described herein. The central server may include a memory for storing reward program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The central server system may be directly or indirectly connected through the I/O bus to any manner of peripheral devices such as storage devices, wireless adaptors, printers, and the like. In addition, a database (DB) may be communicatively connected to the central server and provide a data repository for the storage and correlation of information gathered from the individual dispenser units, receivers, display devices, or nodes of such devices.

It should be appreciated that the network-enabled devices (e.g., the individual dispenser units and/or display devices) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

Figure 3:
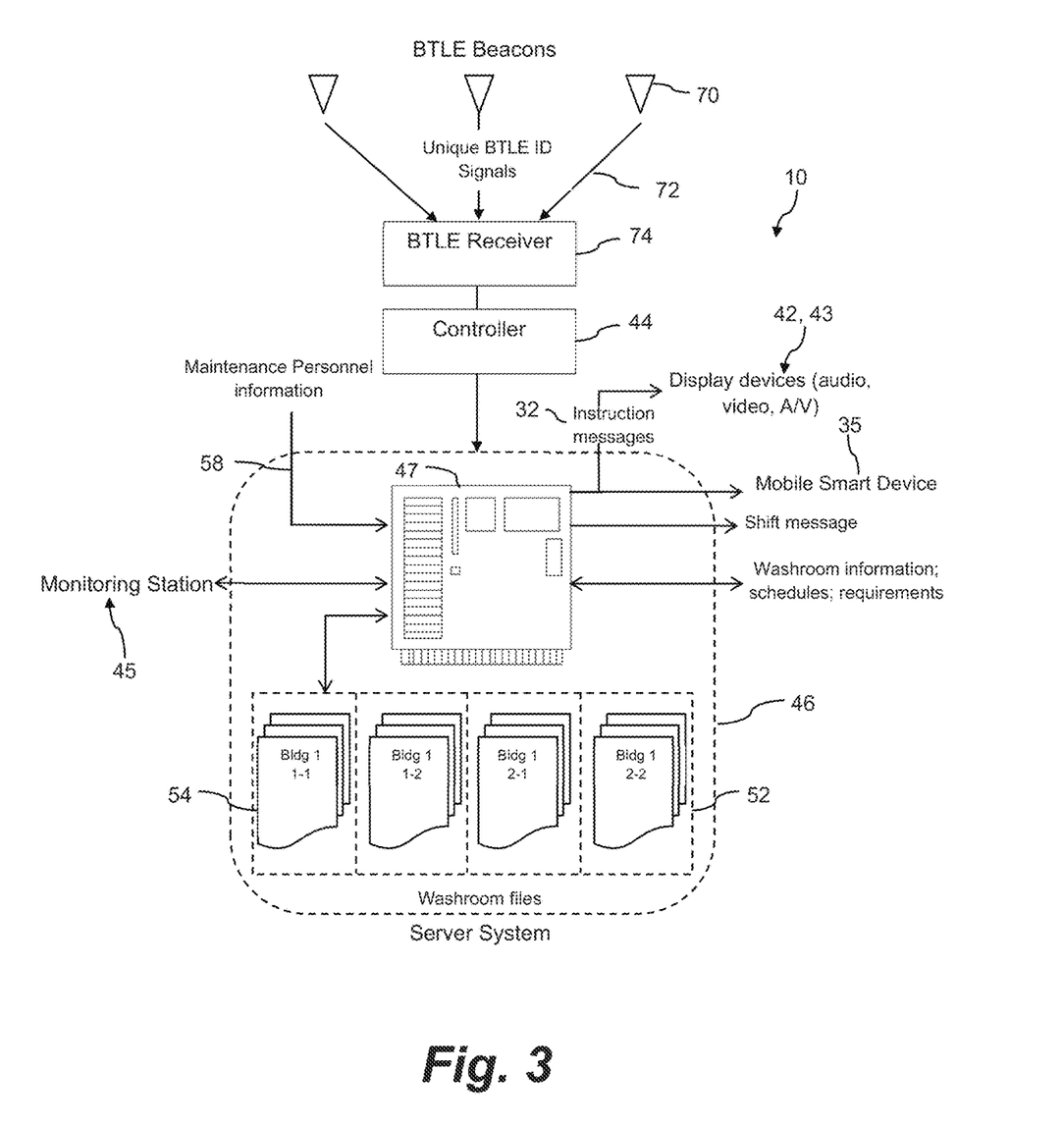
FIG. 3 is a component diagram view of certain control features of a system and method in accordance with the invention.

FIG. 3 is a schematic illustration of certain control aspects of a system 10 in accordance with the invention. In this particular system 10, the server system 46 includes any manner of computer-implemented server 47. The system 46 includes a library 52 in which the washroom facility files 54 are stored. Each file 54 is associated with a particular washroom facility that is also identified in the transmission of the unique BTLE signal 72 generated by a BTLE beacon 70 from the controller 44 to the system server 46. As discussed above, the BTLE beacons 70 are an embodiment of a transmitter 34 carried by the individual maintenance personnel 30 that visits a washroom facility 12 equipped with the system 10. The unique BTLE signals 72 are received by a BTLE enabled receiver 74 located within the washroom facility 12. As discussed above, a single receiver 74 may be associated with each washroom facility 12, or a plurality of different receivers 74 may be located throughout the facility 12, for example at each of the individual functional locations 36 within the facility 12.

Still referring to FIG. 3, the BTLE receiver 74 transmits all or a portion of the signals 72 (including a signal generated from the signal 72) the to the server system 46 (via a controller 44 in certain embodiments) while also identifying the particular washroom facility 12 in which the signals 72 were generated. The server system 46 retrieves the related files, generates the appropriate instructional messages 32, and transmits the messages for play/display by the devices 42, 43 within the washroom facility 12, or via the personnel's mobile smart device 35.

FIG. 3 depicts a number of inputs to the server system 46 that enable different types of instructional and personalized messages 32 to be generated and broadcast to the personnel 30. For example, one of the inputs labeled "Maintenance Personnel information" may relate to personalized information for each personnel 30, such as name, job schedule, facility responsibilities, and so forth. Another input relates to washroom information, such as special events, historical product usage, cleaning/refill schedules, complaints/comments regarding particular washrooms, types of dispensers in the washroom, and so forth. One of the outputs depicted in FIG. 2 is labeled "shift message" and relates to the embodiment discussed above wherein instructional messages are generated and delivered to the maintenance personnel at the beginning of a work shift that inform the personnel of the status of their washrooms, anticipated amount of product refills, upcoming events that may affect washroom usage, and so forth.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for maintenance of a plurality of washroom facilities by maintenance personnel, wherein each of the washroom facilities has one or more consumable product dispensers that require periodic refill, the method comprising:
    for each of the washroom facilities, configuring the product dispensers with a sensor that detects a product level or amount condition of the product dispenser, the sensors in communication with a monitoring station assigned to the washroom facility;
    storing one or more washroom facility files on a server system, the one or more washroom facility files including information regarding the product level or amount condition of the product dispensers;
    generating a message including a set of instructions unique to each of the washroom facilities based, at least in part, upon a set of washroom facility files stored on a server system, the set of instructions including instructions as to the amount of product refill to be added to the dispenser; and
    transmitting the message including the set of instructions to maintenance personnel.

2. The method as in claim 1, wherein the set of instructions comprises expected refill requirements of the washroom facilities assigned to the maintenance personnel based on current conditions or requirements in the washroom facility files.

3. The method of claim 1, wherein the message is delivered to a mobile smart device carried by the maintenance personnel.

4. The method as in claim 1, wherein the maintenance personnel is identified by name in the message.

5. The method as in claim 1, wherein the message identifies each of the washroom facilities assigned to the maintenance personnel.

6. The method as in claim 1, wherein the message informs the maintenance personnel of upcoming events that may increase usage of the washroom facility.

7. The method as in claim 1, wherein the message including the set of instructions includes dispenser refill instructions based on an anticipated usage of the washroom before a next scheduled visit by the maintenance personnel.

8. The method as in claim 1, further comprising an identification (ID) system configured within each washroom facility to identify a maintenance personnel that enters the washroom facility and provide a second message to the maintenance personnel.

9. The method as in claim 8, wherein the ID system is configured to deliver the second message to a mobile smart device carried by the maintenance personnel.

10. The method as in claim 8, further comprising an audio or visual display device in the washroom facility, the second message delivered via the audio or visual display device.

11. The method as in claim 8, wherein a plurality of the washroom facilities are assigned to a common monitoring station, the monitoring station in communication with the server system, and wherein the ID system includes an ID signal transmitter carried by each of the maintenance personnel that generates an ID signal that is unique to the maintenance personnel, the washroom facility configured with a receiver that receives the ID signals from the ID signal transmitters and transmits the ID signals to a controller that is in communication with the server system.

12. The method as in claim 11, wherein the ID signal transmitters are Bluetooth Low Energy (BTLE) beacons that emit a unique BTLE ID signal, the server system maintaining a library of the unique BTLE signal assigned to each maintenance personnel, the receiver comprising a BTLE-enabled receiver that receives and transmits all or a portion of the unique BTLE ID signals to the controller to enable retrieval of the file related to the unique BTLE ID signal by the server system.

13. The method as in claim 11, wherein the BTLE beacon is incorporated with a device provided to the maintenance personnel.

14. The method as in claim 11, wherein the BTLE beacon is incorporated with a mobile smart device carried by the maintenance personnel, the mobile smart device having an application that causes the mobile smart device to transmit the unique BTLE ID signal.

* * * * *